United States Patent [19]

Tanaka et al.

[11] Patent Number: 4,776,028
[45] Date of Patent: Oct. 4, 1988

[54] APPARATUS FOR AND METHOD OF COMPRESSING FORM DATA

[75] Inventors: Nobuyuki Tanaka; Katsumi Asanuma, both of Kanagawa, Japan

[73] Assignee: Fuji Photo Film Co., Ltd., Kanagawa, Japan

[21] Appl. No.: 853,294

[22] Filed: Apr. 17, 1986

[30] Foreign Application Priority Data

Apr. 20, 1985 [JP] Japan ................ 60-085235

[51] Int. Cl.⁴ .................................... G06K 9/00
[52] U.S. Cl. ....................... 382/56; 358/260
[58] Field of Search ................. 382/56; 358/260

[56] References Cited

U.S. PATENT DOCUMENTS 3,347,981 10/1967 Kagan et al. .................. 382/56
3,686,631 8/1972 Elliot .................................. 382/56
4,193,092 11/1980 Stoffel ............................ 358/136
4,365,273 12/1982 Yamada et al. .................. 382/56
4,580,134 4/1986 Campbell et al. .............. 340/703
4,622,585 11/1986 Reitsma .......................... 358/135

Primary Examiner—Leo H. Boudreau
Assistant Examiner—Donald J. Daley
Attorney, Agent, or Firm—Sughrue, Mion, Zinn, Macpeak & Seas

[57] ABSTRACT

A form data compressing method in which form data are stored in memory for every raster, the raster data pattern of each raster is divided into a plurality of units each having a plurality of bits, the unit data patterns of these units are subjected to comparison to perform the compression in unit order direction, and according to the compression data obtained by the compression in unit order direction the compression in raster order direction is carried out.

10 Claims, 5 Drawing Sheets

FIG. 3A
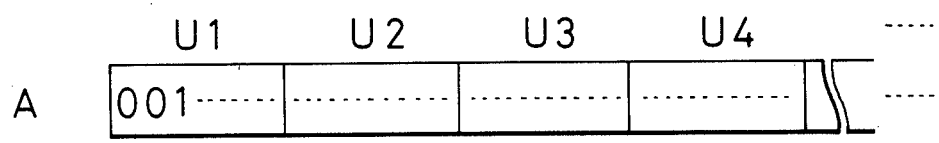
FIG. 3B
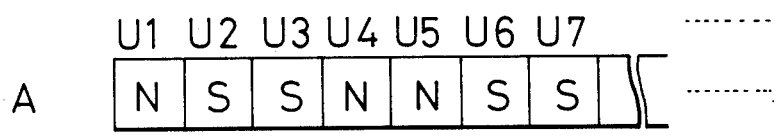
FIG. 3C
a : 0 0 1 1 1 0 0 1 1 0 0 0 0 1 1 1    (REAL PATTERN OF $U_1$)
b : 0 1 1 1 1 1 1 1 1 0 0 0 1 1 1 1    (REAL PATTERN OF $U_2$)
c : 1 1 1 1 1 0 0 0 0 0 0 1 1 1 1 1    (REAL PATTERN OF $U_3$)
⋮
z

APPARATUS FOR AND METHOD OF COMPRESSING FORM DATA

BACKGROUND OF THE INVENTION

This invention relates to a method of and apparatus for compressing form data employed, for instance, for a COM (computer output microfilming) device.

The COM device, to which the technical concept of the invention is effectively applicable, is used to record variable data, such as incoming and outgoing data entered in a business book, on a recording medium in combination with fixed data, such as those of forms with lines as included in a business book (cf. "Micrographic Systems" (second edition) by Daniel M. Costigan published from NATIONAL MICROGRAPHICS ASSOCIATION, and U.S. Pat. No. 4,293,202.

In one example of the method, variable data recorded on a recording medium, such as a recording magnetic tape, are processed by computer for display on the picture plate of a cathode ray tube. The picture thus displayed is superposed on the picture obtained by optically reading the fixed data recorded on a form slide. The combined display is recorded as a frame on a microfilm. In another example of the method, a video signal of the variable data, obtained by computer-processing, is recorded on a recording medium in combination with a video signal of the fixed data which are obtained by scanning a form slide with a laser beam.

However, these conventional methods are disadvantageous in that, as the form slide is optically read, in recording the picture, the latter is liable to be shifted or distorted.

The difficulty may be eliminated by employing a method in which, instead of directly reading the fixed data of the form slide during the recording operation in the COM device, the fixed data of the form slide are stored as electrical signals in a memory, and are then read out of the memory during the recording operation.

In general, recording pictures for a COM device have at least about 2000×2500 resolution points per frame. Accordingly, it is difficult to provide a memory which has a sufficient number of memory locations equal to the number of resolution points. If a plurality of memories are provided to cover all the resolution points, then the device becomes large, complex and expensive.

On the other hand, the form data comprises: framing data such as those of ruled lines; and fixed data such as those of customer names and code numbers which are to be recorded at predetermined positions. Clearly, less form data must be recorded to produce a form picture since much of the form is blank and a significant part of the form data is redundant (blank data). Therefore, if a method is employed in which the form data, after being compressed, are stored in memory, and the memory is operated together with the COM device to expand the data, so that the composite picture of the above-described variable data and the form data is recorded, then it is possible to miniaturize the COM device and to obtain a variety of advantages, such as, a reduction of the manufacturing cost.

Examples of conventional data compressing methods are a run length method, a plane coding method, and a change point address coding method. All of these methods are generally employed in the field of communication; however, these methods are disadvantageous in that they are intricate, and have a low processing speed. In the case of a COM device, the data should be processed at least at a rate of 30 ns per picture element; however, in the case of the run length method, there is insufficient time for compressing and expanding the data in such a short period.

SUMMARY OF THE INVENTION

In view of the foregoing difficulties accompanying a conventional data compressing method, an object of this invention is to provide a method of compressing form data in which data can be compressed and expanded readily and quickly.

The foregoing object and other objects of the invention have been achieved by the provision of a method of compressing form data in which form data are stored in memory for every raster; in which, according to the invention, raster addresses are assigned to rasters in the raster scanning order, according to the order of the raster addresses thus given the raster data pattern of each raster is divided into a plurality of units each having a plurality of bits, and unit addresses are assigned to the units, respectively, the unit data pattern of each unit in the raster is compared with that of the first preceding unit which immediately precedes the unit, and when the unit data pattern of the unit is coincident with that of the first preceding unit in a coincidence code is stored in a unit memory, whereas when the unit data of the unit is not coincident with that of the first preceding unit a non-coincidence code is stored in the unit memory and the unit data pattern of the unit is stored as a real pattern in a real pattern memory, with respect to the coincidence and non-coincidence codes stored in the unit memory the raster is compared with preceding rasters, successively, which precede the raster, and with respect to the unit data patterns stored in the real pattern memory the raster is compared with the preceding rasters, successively, and when the coincidence or non-coincidence code patterns and the unit data patterns are coincident with each other the raster address of the raster is changed into the raster address of the preceding raster which is coincident with the raster, and the raster address of the preceding raster is stored in a raster address memory, and when not, the raster address of the raster is stored in the raster address memory as it is.

In practicing the method of the invention, it is preferable that, at all times, as for the first unit of each raster, a non-coincidence code is stored in the unit memory, and the unit pattern thereof is stored in the real pattern memory.

Furthermore, it is suitable that the raster address memory, the unit memory, and the real pattern memory are usable for data expansion.

The nature, principle and utility of the invention will become more apparent from the following detailed description and the accompanying claims when read in conjunction with the accompanying drawings.

DETAILED DESCRIPTION OF THE INVENTION

Figure 2:
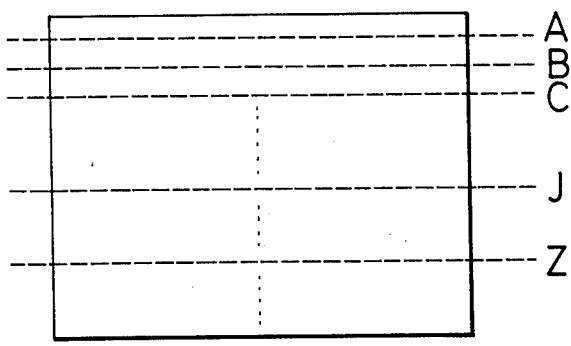
FIG. 2, the parts (A), (B) and (C) of FIG. 3, and FIGS. 4 and 6 are explanatory diagrams for a description of the method of the invention.

A form data compressing method according to this invention will be described with reference to FIGS. 2 through 4.

First, raster addresses A, B, C, ... Z ... are given to the rasters beginning with the top raster as shown in FIG. 2.

Next, according to the order of the raster address, a raster (which is the raster A in this case) is selected, and the raster data pattern of the raster thus selected is divided, every n bits, into a plurality of units. Unit addresses U1, U2, U3, U4, ... are assigned to these units, respectively, as shown in FIG. 3A.

Subsequently, the unit data pattern of a unit is compared with that of its preceding unit. When the unit data pattern of the former coincides with that of the latter, the data pattern of the former is replaced by a coincidence code S, and when not, it is replaced by a non-coincidence code N, as shown in FIG. 3B. These results are stored in a unit memory. The real unit data pattern of only the units having the non-coincidence code N (which have the unit addresses U1, U4, U5, ... in this case) are stored in a real pattern memory (FIG. 3C). In FIG. 3C, reference characters a,b,c,d, ... and z designate real pattern addresses.

According to the above-described method, the redundancy in unit order direction of a single raster can be compressed.

Next, the following raster B is processed in the same manner as the raster A. As a result, the compression data of the raster B are obtained which correspond to the compression data of the raster A (the coincidence and non-coincidence codes (FIG. 3B) stored in the unit memory (hereinafter referred to as "the content of the unit memory"), and the unit data patterns (FIG. 3C) stored in the real pattern memory (hereinafter referred to as "the content of the real pattern memory"). The content of the unit memory for the raster A is compared with that of the unit memory for the raster B, and the content of the real pattern memory for the raster A is compared with that of the unit memory for the raster B. When the raster B coincides with the raster A in both of the comparisons, the raster address "B" of the raster B is changed into the raster address "A", which is stored in a raster address memory. When the raster B does not coincide with the raster A in one of the two comparisons, the raster address of the raster B is stored in the raster address memory as it is.

Similarly, when the compression data of the raster C is obtained, it is compared with that of the raster B (the preceding raster). When the former coincides with the latter, the raster address "C" of the raster C is changed into the raster address "B", which is stored in the raster address memory. Thereafter, the raster data pattern of the following raster, namely, the raster D, is subjected to compression.

When the compression data of the raster C is not coincident with that of the raster B, the preceding raster, then the compression data of the raster C is compared with that of the raster A, the second higher raster from the raster C. When the compression data of the raster C is coincident with that of the raster A, then the raster address "C" of the raster C is changed into the raster address "A", which is stored in the raster memory. When not coincident, the raster address "C" of the raster C is stored therein as it is.

Similarly as in the above-described case, when the compression data of the raster Z is obtained, it is compared with the compression data of the higher rasters (Y, X, W, ... and A) successively. And the raster address determined according to the comparison is stored in the raster address memory.

Figure 4:
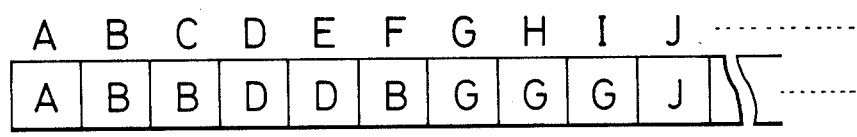

According to the above-described method, the redundancy in raster order direction can be compressed as shown, by way of example, in FIG. 4.

When a raster address is specified, the following process is carried out: When the raster data pattern of the raster thus addressed coincides with that of a higher raster, the raster address of the higher raster is called out of the raster address memory, and when not, the address of the addressed raster is called.

As is apparent from the above description, according to the method of the invention, the redundancy in unit order direction and the redundancy in raster order direction can be more readily compressed.

On the other hand, the data can be expanded as follows: When a raster address is specified, the raster address thus specified or the highest raster address, whose raster data is the same as that of the raster address specified, is called out of the raster address memory. With the aid of the raster address thus called, the raster having compressed unit data, which corresponds to the raster address, is called out of the unit memory. In correspondence to the non-coincidence code N of the unit data, the real pattern is read out of the real pattern memory. When it is of the coincidence code S, the real pattern of the preceding unit is outputted as the real pattern of the instant unit. Therefore, the method can expand the data more quickly than the conventional method.

Figure 1:
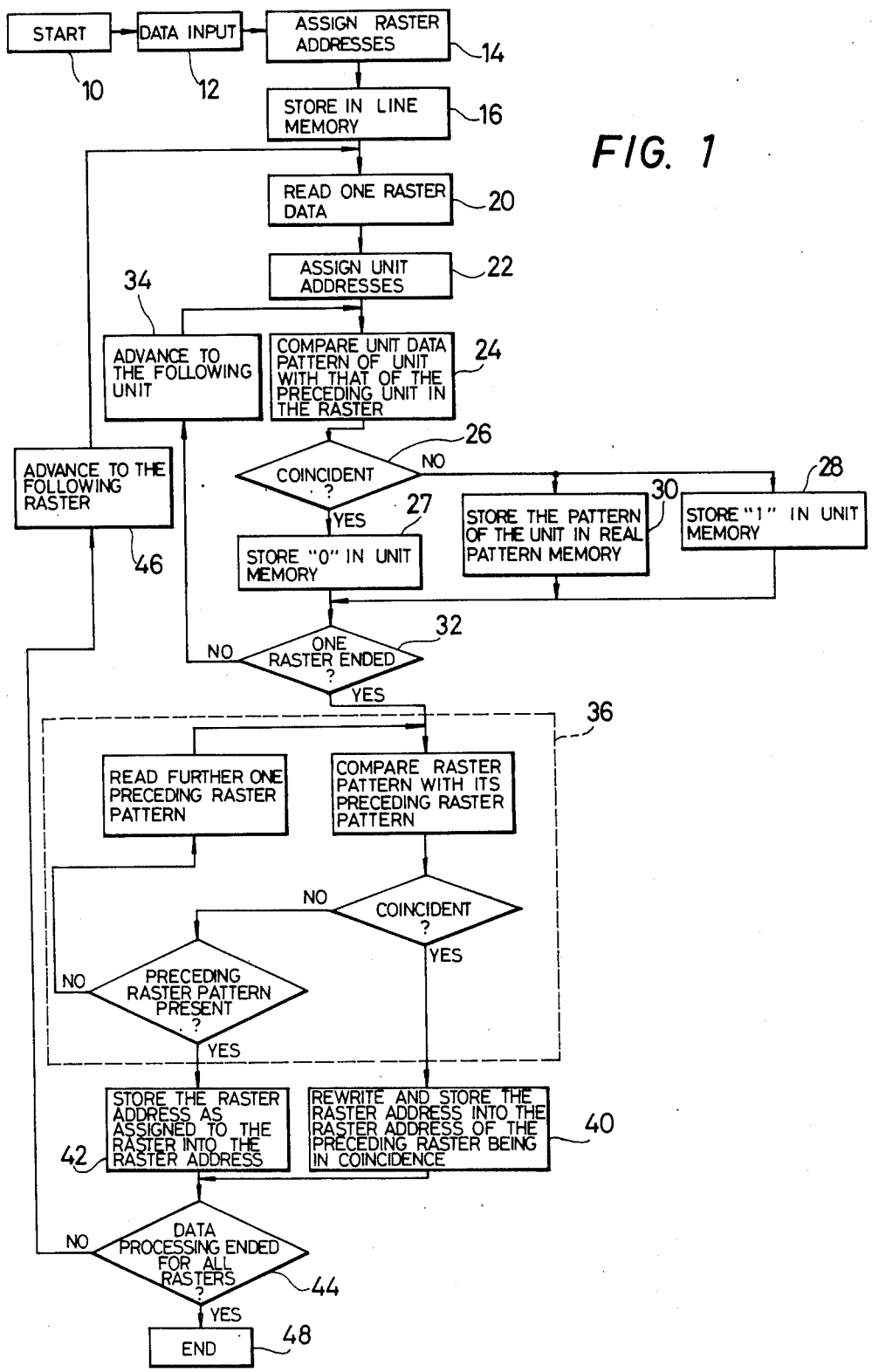
FIG. 1 is a flow chart for a description of a method for compressing form data, according to this invention.
Figure 6:
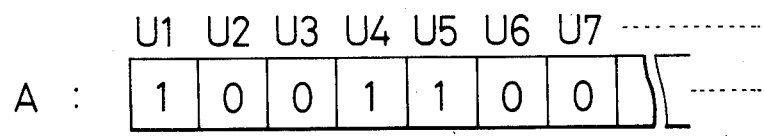
Figure 5:
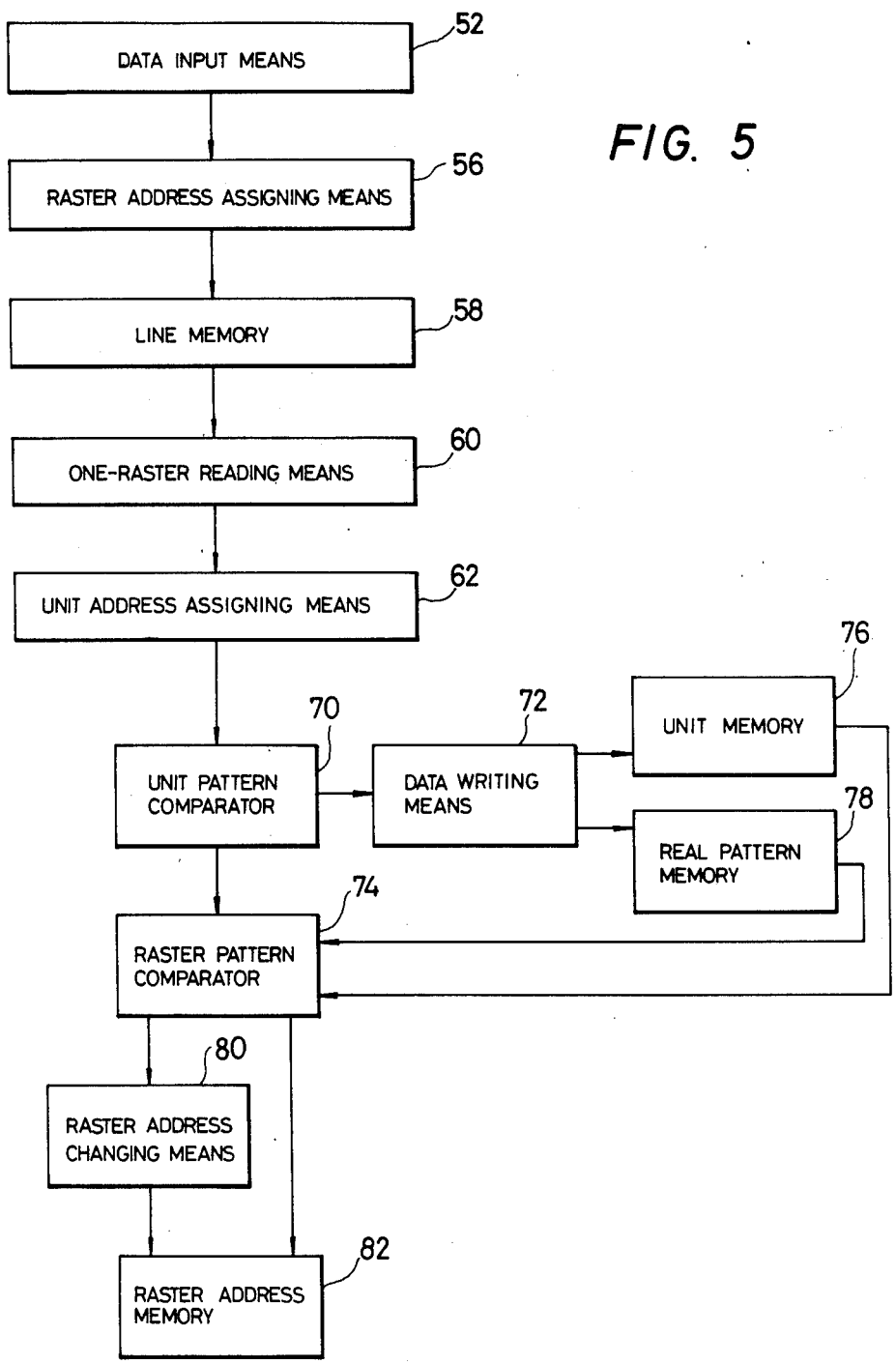
FIG. 5 is a block diagram showing one example of a device for practicing the method of the invention.
Figure 7:
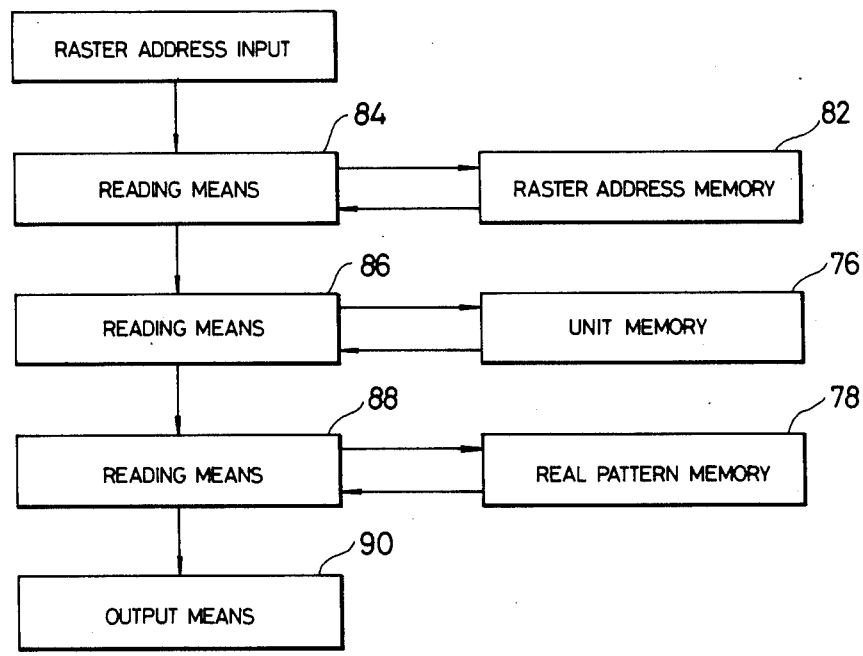
FIG. 7 is a block diagram showing one example of a device for expanding the data which has been compressed according to the method of the invention.

Now, the operation of one embodiment of the invention will be described. FIG. 1 is a flow chart for a description of the method of the invention. FIG. 5 is a block diagram showing one example of a device for practicing the method of the invention. FIG. 6 is a diagram of a method of the invention. FIG. 7 is a block diagram showing one example of a device for expanding the data compressed according to the invention.

These figures shows only the main operating flows and means, and it should be noted that the invention is not limited thereto or thereby.

As shown in FIG. 1, in Step 10 the form data compression method is started. The form data of each of the rasters in one frame 50 (FIG. 2) consisting, for instance, of 1980 rasters and 2596 dots per raster are inputted by operating data inputting means 52 (FIG. 5) such as a keyboard according to a predetermined program (Step 12).

The 1980 rasters data thus inputted are assigned raster addresses A, B, C, ... Z ... by a raster address assigning means 56 (FIG. 5) beginning with the top (or highest) raster data (Step 14).

These raster data are stored in a line memory 58 (Step 16). The raster data pattern of one raster is read out of the line memory 58 by one-raster reading means 60 beginning with the highest raster (Step 20). Next, unit address assigning means 62 divides the raster data pattern thus read out into a plurality of units each having n bits, for instance 16 bits, and assigns unit addresses U1, U2, U3, U4, ... to the units in order (Step 22). According to the unit addresses, the unit data patterns are read out beginning with that of the highest order unit. And in a unit pattern comparator 70, the unit data pattern of a unit is compared with that of the preceding unit, so that it is determined whether or not the unit data pattern of the former coincides with that of the latter (Step 24). It goes without saying that the unit pattern comparator 70 includes buffer memory, etc.

The unit data pattern comparison will be described in more detail.

When the data pattern of the units, for instance, of the raster A are successively applied to the unit pattern comparator 70, the comparator 70 gives the non-coincident code N, for instance "1", as compression data to the unit data pattern of the first unit address U1 of the raster at all times (since there is no units for comparison before the first unit, only the non-coincidence code is given thereto (FIG. 3B). The non-coincidence code N is stored in the corresponding address in a unit memory 76, and the real pattern, for instance "0011100110000111" as shown in the part (C) of FIG. 3, is stored in real pattern memory 76 through data writing means 72 (Steps 26, 28 and 30).

If in Step 32 the decision results in "No", then in Step 34 the next unit is picked up. And the unit data pattern of the second address U2 and the unit data pattern of the first address U1 are subjected to comparison in the unit pattern comparator 70.

When the two patterns coincide with each other, the coincidence code S, for instance, "0", is given to the instant unit (Steps 26 and 27). When the two patterns do not coincide with each other, the non-coincidence code "1" is give to the instant unit (Step 28). The data "0" or "1" is stored in the predetermined address in the unit memory 76 by means of the data writing means 72. In addition, in the case of the non-coincidence, the real pattern of the instant unit is stored in a real pattern memory 78 by means of the data writing means 72 (Step 30).

That is, while the data patterns of the units are sequentially applied to the unit pattern comparator 70, whenever the data pattern of a unit is compared with that of the preceding unit beginning with that of the top unit, the coincidence code or the non-coincidence code is stored at the corresponding location in the unit memory 76. By way of example, the units given with the codes "1" and "0" are as shown in FIG. 6. In FIG. 6, the data patterns of the unit addresses U1, U4 and U5 are in non-coincidence; and the unit addresses U2 and U3 are coincident in data pattern with the unit address U1 while the unit addresses U6 and U7 are coincident in data pattern with the unit address U5.

FIG. 3C shows examples of the real patterns in the case of non-coincidence.

When, in Step 32, it is confirmed that the redundancy in unit order direction of the one raster and the raster data of the preceding raster are subjected to comparison in a raster pattern comparator 74 (Step 36); that is, compression of the redundancy in raster order direction is started.

The compression of the redundancy in raster order direction will be described in more detail. In practice, the compression is carried out by utilizing the contents of the unit memory and the real pattern memory, which have been obtained during the compression in unit order of the raster.

First, the one-raster reading means 60 is operated to read the raster data pattern. For instance, the raster A corresponding to the raster address is read out of the line memory 58.

Next, a series of operations from Step 22 to Step 32 are carried out, to perform the compression of the redundancy in unit order direction of the raster data pattern of the raster A.

Then, after it is confirmed in Step 32 that the redundancy in unit order direction of the raster A has been compressed, the contents of the unit memory and the real pattern memory which are the compression data in unit order direction of the raster data pattern of the raster A (hereinafter referred to as "the compression data of the raster A", when applicable) are compared with the contents of the unit memory and the real pattern memory of the first preceding raster, or the second preceding raster when necessary as indicated in Step 36.

When the raster is available which is higher in order than the raster A (hereinafter referred to as "a higher order raster", when applicable) and is coincident with the raster A, both in the contents of the unit memory and in the contents of the real pattern memory, raster address changing means 80 changes the raster address of the raster A into the raster address of the higher order raster, which is stored in a raster address memory 82 (Step 40). If the higher order raster is not available, the raster address of the raster A is stored in the raster address memory (Step 42).

In the above-described example, there is no raster which precedes the raster A. Therefore, the comparison by the raster pattern comparator 74 results in "non-coincidence", and the raster address of the raster A is stored in the raster address memory.

Next, it is detected whether or not the raster A is followed by another raster (Step 44). When the following raster (the raster B in this case) exists, the raster data pattern thereof is compressed (Step 46).

Next, the following raster, i.e., the raster B, is processed in the same manner as the raster A, thereby to obtain the compression data of the raster B which corresponds to the compression data (the contents of the unit memory and the real pattern memory) of the raster A.

Thereafter, in the raster pattern comparator 74, the content of the unit memory of the raster A is compared with the content of the unit memory of the raster B, and the content of the real pattern memory of the raster A is compared with the content of the real pattern memory of the raster B (Step 36). When the raster B is coincident with the raster A both in the content of the unit memory and in the content of the real pattern memory, with the aid of the raster address changing means 80 the raster address of the raster B is changed into the raster address A, and the raster address A is stored in the raster address memory (Step 40).

When the raster B is not coincident with the raster A in the content of the unit memory or in the content of the real pattern memory, the raster address of the raster B is stored in the raster address memory (Step 42).

Similarly as in the above-described case, when the compression data of the raster C is obtained, the compression data of the raster C is compared with that of the preceding raster, namely, the raster B. When the raster C is coincident with the raster B both in the content of the unit memory and in the content of the real pattern memory (hereinafter referred to merely as "being coincident", when applicable), the raster address B, and the latter is stored in the raster address memory. Thereafter, the raster data pattern of the following raster, namely, the raster D, is subjected to compression.

When the compression data of the raster C is not coincident with that of the first preceding raster, namely, the raster B, the compression data of the raster C is compared with that of the second preceding raster, namely, the raster A. When the raster C is coincident with the raster A, then the raster address of the raster C is changed into the raster address A, and the latter is stored in the raster address memory; and when not, the raster address of the raster C is stored in the raster address memory as it is.

Similarly, when the compression data of the raster Z is obtained, the compression data of the raster Z is compared with those of the raster (Y, X, W, . . . A) which precede the raster Z, successively, so that a suitable raster address is stored in the raster address memory.

Thus, the redundancy in raster order direction can be compressed as shown in FIG. 4.

When the compression in unit order direction and the compression in raster order direction of all the raster data stored in the line memory 58 have been accomplished in the above-described manner, the raster data compression has been achieved (Steps 44 and 48).

The above-described means 52, 56, 60, 62, 72 and 80, memories 58, 76 and 82, comparators 70 and 74, and other devices can be readily formed by using conventional electronic elements and parts.

Now, expansion of the compressed form slide data by using the raster address memroy 82, the unit memory 76 and the real pattern memory 78 will be described with reference to FIG. 7.

FIG. 7 is a diagram outlining the arrangement of a data expanding section of a COM device which is used in writing form data on a recording medium such as a microfiche.

As shown in FIG. 7, the memories 82, 76 and 78 are provided with reading means 84, 86 and 88 for access to reading signals, respectively. For instance when the raster address input of each raster is applied to the reading means 84 in synchronization with the reading of variable data from the computer, the raster address or renewed raster address of the raster thus accessed is read out of the raster address memory 82 by the reading means 84. The raster address thus read out is supplied to the subsequent reading means 86. As a result, the reading means 86 makes access to the unit memory 76 so that the compression data "1" and "0" are supplied to the reading mean 88, to cause the latter 88 to make access to the real pattern memory 78. In the case of the compression data "1", the real pattern of the unit corresponding thereto is read out of the real pattern memory, and the real pattern thus read out is supplied to output means 90, so that the data of the real pattern is outputted. In the case of the compression data "0", the signal is supplied to the output means 86, so that the same unit data pattern as the unit data pattern of the unit which is located immediately before the instant unit is outputted. When the COM device is operated by using the outputs thus provided, then form data such as for instance ruled lines can be recorded in combination with variable data such as customer data and transaction data.

While one embodiment of the invention has been described, it should be noted that the invention is not limited thereto or thereby, and it goes without saying that the various means in the embodiment can be replaced by magnetic, electrical, mechanical or optical means.

For instance, in the embodiment, form raster data are inputted by operating the keyboard; however, the method may be replaced by a method in which the form raster data are recorded on a form slide, and the form slide is read with a light beam such as a laser beam, so that the data of each raster are converted into digital codes.

The technical concept of the invention is applicable not only to the aforementioned COM device but also to a device for compressing the image data the larger part of which is for blank regions having ruled lines or the like.

As is apparent from the above description, in the form data compressing method of the invention, the raster data pattern is divided into a plurality of units each comprising a plurality of bits, the unit data patterns of these units are subjected to comparison to perform the compression in unit order direction, and according to the compression data (the contents of the unit memory and the real pattern memory) obtained by the compression in unit order direction the compression in raster order direction is carried out. Therefore, the method of the invention can readily and accurately achieve the compression in high compression rate, when compared with the conventional method.

Furthermore, according to the invention, a system may be employed in which form data to be processed by the COM device, after being compressed, are stored in a memory, and the form data thus stored are read out of the memory when actually required for data recording. Therefore, the memory used may be small in capacity, and the device employed may be simple in construction and can be manufactured at low cost.

Since the memory in which the compressed data have been stored is used, the method of the invention can more readily expand the data than the conventional method. Furthermore, the time required for expanding the data according to the method of the invention is much shorter; for instance the data of one picture element can be written in 30 ns.

What is claimed is:

1. An apparatus for compressing form data adapted to be identified as a first plurality of points containing data in one of at least first and second states, said points being disposed alaong a plurality of sequential raster lines having a predetermined order or priority, said apparatus comprising:

input means (52) for providing said form data;

means for assigning an address to each of said raster lines;

means for dividing said first plurality of points of said form data into a third plurality of sequential units within each of said raster lines, each of said units having at least two points, and means for assigning an address to each unit in said raster lines;

first storage means (58) for storing data related to each of said raster lines;

second storage means (76) for storing data related to each unit of a raster line;

first comparing means for comparing the states of each of the points in each successive one of said sequential units of a given raster line with the states of each of the points in another one of said sequential units and storing the results of said comparison in said second storage means, second comparing means (74) for comparing the raster lines in a predetermined order based upon the content of said second storage means;

third storage means (80,82) for storing the address of each one of said raster lines in a respective assigned location if no identity of raster lines is found and for storing the address of a higher order raster line in said respective assigned location if identity is found.

2. The apparatus of claim 1 wherein said second storing means comprises a first memory for storing a code identifying the result of said unit comparisons and a second memory for storing the unit data for at least a first unit and each subsequent unit for which there is no identity with a preceding unit.

3. The apparatus of claim 2 wherein said third storage means and said second storage means are adapted to be read out and for reconstruction of said form data.

4. A method of compressing form data adapted to be identified as a first plurality of points disposed along a second plurality of sequential raster lines, each point identifiable by a third plurality of digital bits, the bits being dividable into a fourth plurality of sequential bit groups per line, said method comprising the steps of:

providing each bit group with a unique bit group address in a first and second memory;

providing each of said raster lines with a unique raster address in a third memory;

beginning with a first of said raster lines, establishing the bit pattern in said first group as a reference pattern and storing said pattern in a respective bit group address in said first memory;

comparing the bit pattern in said second group to said reference pattern and if said patterns coincide, storing a first code at the respective bit group address in a second memory and if said patterns do not coincide, storing a second code at the respective bit group address in said second memory and said second bit pattern at the respective bit group address in said first memory;

comparing the bit pattern of each subsequent group of said first raster line with the bit pattern of its proceeding group and storing said first or second codes at the respective bit group address in said bit pattern at the respective bit group address in said first memory;

continuing with each subsequent raster line, establishing the bit pattern in its first group as a reference pattern, comparing the bit pattern in its second group to said reference pattern and, if said patterns coincide, storing the first code at the respective bit group address in said second memory and, if said patterns do not coincide, storing said second code at the respective bit group address in said second memory and said second bit pattern at the respective bit group address in said first memory, and comparing the bit pattern of each subsequent group of said second raser line with the bit pattern of its proceeding unit and storing said first or second codes and said bit patterns in said second and first memories, respectively;

comparing the content of said first and second memories representing said first raster line with the content of said memories representing said second raster line and, if said contents coincide, storing in the third memory at the address of said second raster the address of said first raster and if said contents do not coincide, storing in the third memory at the address of said second raster the address of said second raster;

continuing with each subsequent raster line, comparing the content of said first and second memories representing such line with the content of the first and second memories of each proceeding raster line unit a coincidence is found, in which event the address of said subsequent line is stored in the third memory at the address of said coincident raster, or until the first raster line has been compared without coincidence, in which event the address of said subsequent line is stored in the third memory at the address of said subsequent line.

5. A method of compressing form data adapted to be identified as a first plurality of points containing data in one of at least first and second states, said points being disposed along a second plurality of sequential raster lines having a predetermined order or priority, each point being identifiable by a third plurality of digital bits, comprising the steps of:

dividing said first plurality of points of said form data into a fourth plurality of sequential units within each of said raster lines, each of said units having at least two points;

determining the coincidence of the states of each of the points in each successive one of said sequential units with the states of each of the points in a respective previous one of said sequential units in each raster line, storing for each of said units in each line a representation of coincidences as a first signal and non-coincidence as a second signal, said first and second signals being stored as a first group of signals, and storing a representation of the state of each point within each of said units represented by said second signal as a second group of signals;

determining the coincidence of said first and second groups of signals as among raster lines based upon said predetermined order; and identifying a second priority raster line as a first priority raster line if the first and second groups of signals for each of said lines coincide.

6. The method of claim 5 wherein the step of storing said first and second groups of signals includes the assigning o f unique memory addresses to each of said units.

7. The method of claim 5, wherein said step of identifying further includes the step of storing the address of a first raster line in a portion of a memory for storing the address of a second raster line depending on whether or not said first or second groups of signals for said first raster line coincide with said first and second groups of signals for said second raster line.

8. The method of claim 5 wherein the address of one raster line is stored in a portion of a memory if said first and second groups of signals for said one raster line do not coincide with said first and second groups of signals for any preceding raster line but if said first and second groups of signals for said one raster line coincide with said first and second groups of signals for a preceding raster line, the address of said preceding raster line is stored in the portion of the memory.

9. The method of claim 5, wherein said second groups of signals represents data points in a first unit and the data points from units that differ from a preceding unit.

10. An apparatus for compressing form data adapted to be identified as a first plurality of points containing data in one of at least first and second states, said points being disposed along a plurality of sequential raster lines having a predetermined order of priority, each point being identifiable by a third plurality of digital bits, said apparatus comprising:

input means for providing said form data;

means for assigning an address to each of said raster lines;

means for dividing said first plurality of points of said form data into a fourth plurality of sequential units within each of said raster lines, each of said units having at least two points, and means for assigning an address to each unit in said lines;

first storage means for storing data related to each of said raster lines;

second storage means for storing data related to each unit of a raster line;

first comparing means including means for comparing the states of each of the points in each successive one of said sequential units of a given raster line with the states of each of the points in a previous one of said sequential units, means for storing the results of said comparison in said second storage means as first signals each indicative of coincidence and second signals each indicative of non-coincidence, said first and second signals being stored as a first group of signals, and means for storing a representation of the state of each point for each of said units represented by said second signals as a second group of signals in said second storage means, second comparing means for comparing the first and second groups of signals for each of the raster lines in a predetermined order based upon the content of said second storage means;

third storage means for storing the address of each said raster lines in a respective assigned location if no identity of the first and second groups of signals of each one of said raster lines is found and for storing the address of a higher order raster line in said respective assigned location if identity is found.

* * * * *